United States Patent
Stevens et al.

(10) Patent No.: US 8,604,629 B1
(45) Date of Patent: *Dec. 10, 2013

(54) RECLAIMING ENERGY FROM WASTE WATER IN TALL BUILDINGS

(71) Applicants: Mark B. Stevens, Austin, TX (US); John D. Wilson, Houston, TX (US)

(72) Inventors: Mark B. Stevens, Austin, TX (US); John D. Wilson, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/740,480

(22) Filed: Jan. 14, 2013

Related U.S. Application Data

(63) Continuation of application No. 13/528,070, filed on Jun. 20, 2012.

(51) Int. Cl.
*F03B 13/06* (2006.01)

(52) U.S. Cl.
USPC .......................................................... 290/1 R

(58) Field of Classification Search
USPC ............. 290/1 R, 43; 405/75; 60/639; 185/27
See application file for complete search history.

(56) References Cited

U.S. PATENT DOCUMENTS

| 4,439,720 A * | 3/1984 | Georges ............................ 322/4 |
| 6,445,078 B1 * | 9/2002 | Cieslak, Jr. .................... 290/1 R |

OTHER PUBLICATIONS

USPTO; Examination Correspondence from a Related U.S. Appl. No. 13/528,070, filed Jun. 20, 2012 by Mark B. Stevens.
people.duke.edu; "Pumped Hydroelectric Storage"; retrieved on Jul. 17, 2013 from http://people.duke.edu/~cy42/PHS.pdf.

* cited by examiner

*Primary Examiner* — Vanessa Girardi
(74) *Attorney, Agent, or Firm* — Robert H. Frantz; Jeffrey S. LaBaw

(57) ABSTRACT

Electrical power is generated from falling liquids such as captured rain water, gray water and black water in tall buildings using two or more reservoirs. Fill valves for each of the reservoirs are controlled to fill the first reservoir in a raised position while emptying the second reservoir in a lowered position. When full, the first reservoir is dropped to the lowered position while imparting mechanical energy to an electrical generator and while raising the second reservoir. Next, the second reservoir is filled until full while the first reservoir is emptied, followed by dropping the second reservoir to the lowered position while imparting mechanical energy to the electrical generator and while raising the first reservoir. The cycle is repeated so that electrical generation from the falling of the liquid avoids the liquid contacting or passing through a turbine or impeller.

4 Claims, 7 Drawing Sheets

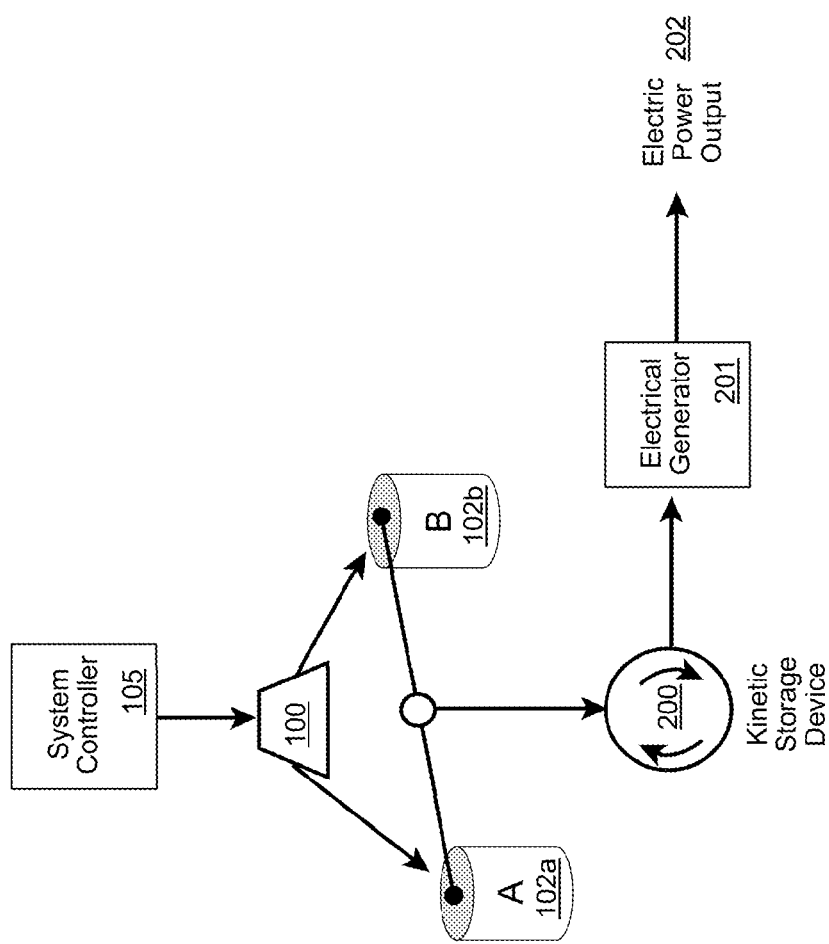

RECLAIMING ENERGY FROM WASTE WATER IN TALL BUILDINGS

CROSS-REFERENCE TO RELATED APPLICATIONS (CLAIMING BENEFIT UNDER 35 U.S.C. 120)

This is a continuation application of Ser. No. 13/528,070, filed on Jun. 20, 2012, by Mark Stevens.

FEDERALLY SPONSORED RESEARCH AND DEVELOPMENT STATEMENT

None.

MICROFICHE APPENDIX

Not applicable.

INCORPORATION BY REFERENCE

None.

FIELD OF THE INVENTION

The invention generally relates to methods of generating electrical power, and especially to systems which capture otherwise wasted energy.

BACKGROUND OF INVENTION

Methods and systems for generating energy from falling water are known in several forms, the most common being hydroelectric dams which seek to capture energy from rivers as the water they carry responds to the downward pull of gravity.

Another method known in the art is a "pump-back" lake, which is actually two lakes separated by a vertical distance. During times in which electricity is in higher demand or when electricity is sold for a greater value, water from the upper lake is released through a hydroelectric dam to the lower lake to generate electricity, which is sold at the higher value or used to supplement the peak demand for energy. Then, when demand is lower or energy prices are lower, electricity is purchased to pump water from the lower lake back up to the upper lake, thereby "reloading" the upper lake to generate electricity during the next peak demand or peak value period. The net value of this system is the difference between the higher value of electricity at the peak demand period and the lower value of electricity at the lower demand period. Most of the water, except for loss via evaporation and absorption, is conserved throughout the process.

Several other methods and systems for generating power as water falls through a building are also known or proposed. In one system, rain water is collected from the top of tall buildings, and directed through downspouts through turbines which generate electricity, and finally into the rain sewer system. Similarly, water may be collected from gray sources, such as showers and clothes washers, and optionally from black sources, such as toilets, and directed through turbines to generate power before it is finally disposed into a sanitary sewer. Each of these approaches uses turbines, which essentially consist of impellers or fan blades over which the falling liquid and contaminants it carries pass, thereby converting a portion of the kinetic energy of the falling liquid and solids into rotational energy which can be directed to an electrical generator.

SUMMARY OF EMPLARY EMBODIMENTS OF THE INVENTION

Electrical power is generated from falling liquids such as captured rain water, gray water and black water in tall buildings using two or more reservoirs. Fill valves for each of the reservoirs are controlled to fill the first reservoir in a raised position while emptying the second reservoir in a lowered position. When full, the first reservoir is dropped to the lowered position while imparting mechanical energy to an electrical generator and while raising the second reservoir. Next, the second reservoir is filled until full while the first reservoir is emptied, followed by dropping the second reservoir to the lowered position while imparting mechanical energy to the electrical generator and while raising the first reservoir. The cycle is repeated so that electrical generation from the falling of the liquid avoids the liquid contacting or passing through a turbine or impeller.

BRIEF DESCRIPTION OF THE DRAWINGS

The description set forth herein is illustrated by the several drawings.

FIG. 2 illustrates a functional arrangement of components of a generating system according to the invention.

DETAILED DESCRIPTION OF EXEMPLARY EMBODIMENT(S) OF THE INVENTION

Figure 1A:
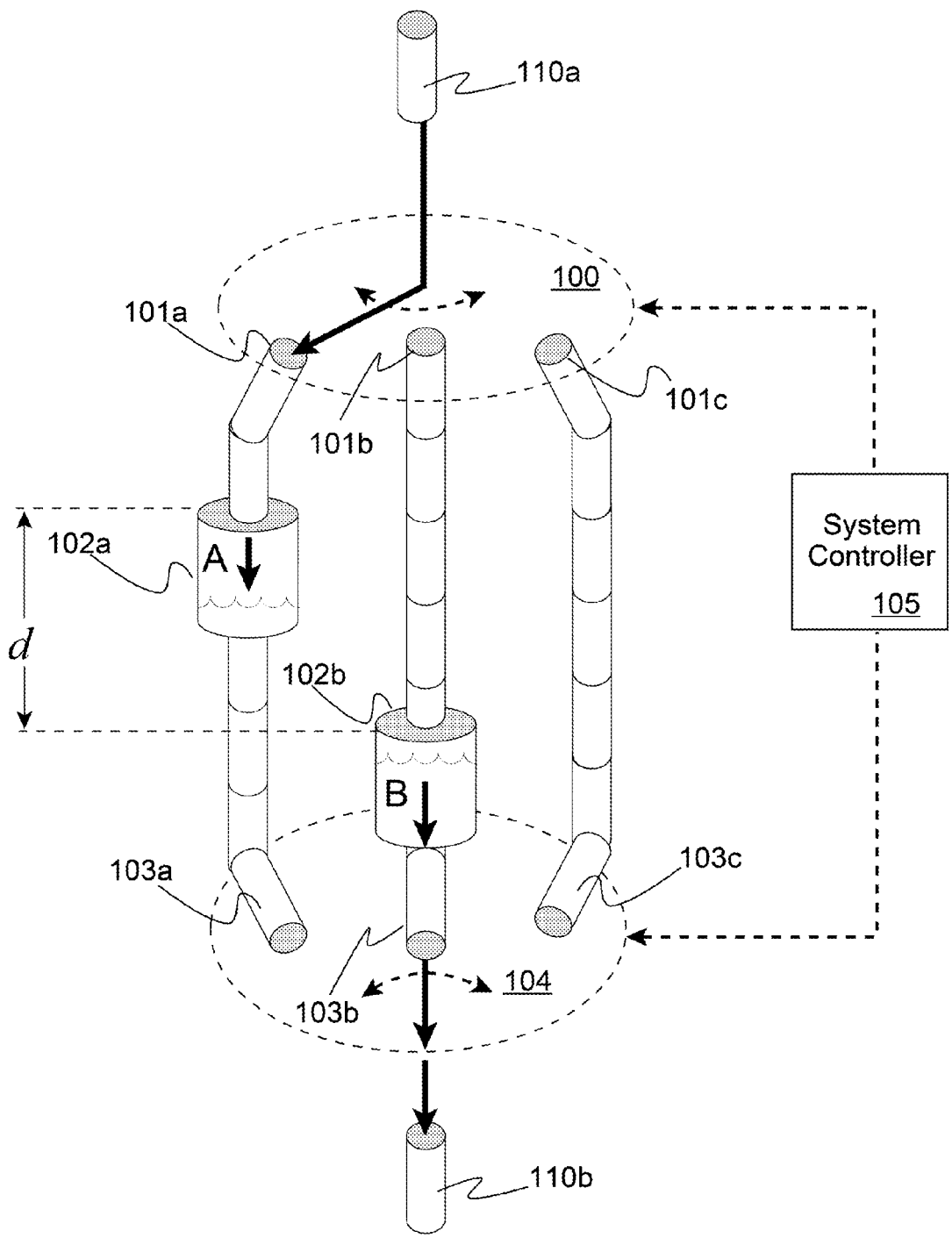
FIGS. 1a through 1d depict four states of a system according to the present invention.

The inventors of the present and the related invention have recognized problems not yet recognized by those skilled in the relevant arts regarding generation of electricity using turbines in line with flowing water and sewage in tall buildings, down mountains, etc. Generally speaking, the contaminants such as sewage solids, dirt, etc., may cling to the turbine blades (e.g. impeller) and over time add mass to the turbine blades. This can eventually lower the performance of the electrical generation to the point where maintenance is required to clean the blades, which is a costly and unclean process.

As the population increases across a mostly fixed footprint of urban land mass, a common way to address the increasing housing needs to expand upwards, especially In cities and land-locked areas. More and more tall buildings will be constructed, and the need to optimize the energy usage will be very important.

One of the systems that every building contains is a wastewater system. Energy is used to move water (and other materials) upwards in the building, and the potential energy of that wastewater as it moves down through the building can be harnessed to create energy.

The present inventors have recognized that there are two problems with the known solutions for generating electrical power from the potential energy of elevated liquids in tall buildings:
1) Clogs/Solids—in the known solutions the wastewater comes in contact with the turbine. Depending on the amount and type of solids in the wastewater this can lead to maintenance issues with the turbines getting clogged and needing to be cleaned out to resume generating power.

2) Frequency of waste-water flow—in many cases depending on the occupancy of the building and the time of day the wastewater might not be a constant flow. Known solutions only generate power while (or immediately after) wastewater flows. Additionally a minimum flow rate is required to engage the turbine.

To address these problems, embodiments of the present invention use two or more reservoirs, a feed/fill control system, and a discharge control system to charge a kinetic storage device, which is then used to generate power. This solves the problem of clogs/solids as there are no moving pieces in-line with the wastewater to clog. This solves the frequency issue as the invention captures small amounts of wastewater until the minimum amount is gathered to put the power generation in motion. Additionally, it can continue to generate power for a short amount of time even after the wastewater has stopped flowing.

Generally speaking, embodiments of the present invention follow a process as such:
1) Wastewater enters the system from above.
2) A fill controller sends the wastewater to one of the empty reservoirs which is in a raised (elevated) position, while emptying one or more of the reservoirs which is in a lower position;
3) When the lower reservoir is empty and the raised reservoir is full, through a mechanical interaction, the full reservoir is allowed to fall or drop, while the empty reservoir(s) is/are allowed to raise, meanwhile the falling action of the full reservoir imparts an impulse of energy to a kinetic storage device, while the flow of water from above may be optionally directed around the system via a bypass;
4) Now, the fill controller directs the flow into the raised, empty reservoir, while the lowered reservoir is emptied; and
5) Upon filling of the raised reservoir and emptying of the lowered reservoir, they are again allowed to swap positions (upper falling, lower raising) while making a mechanical impulse of energy to the kinetic storage device and optionally while diverting additional fill water through a bypass.

This process cycle is repeated for two or more reservoirs in some embodiments, thereby allowing full raised reservoirs to fall and generate electricity, while also raising lowered emptied reservoirs. The kinetic storage device, such as a flywheel or raised weight, drives the input to an electrical generator, which produces electricity on a continuous basis due to the constant output of the kinetic storage device. In some embodiments, only one reservoir may be used which may be lower in cost to implement, but may, depending on design details, not capture as much energy. In such a one reservoir embodiment, the previously-described cycle for just the first reservoir would be implemented, for example. The mechanism for imparting mechanical energy into the kinetic storage device may be any of a range of mechanical, electro-mechanical, magnetic, hydraulic, and pneumatic options, such as but not limited to a chain and sprocket drive system, a shaft drive, a gear drive, a magnetic coupling, a hydraulic pump, and a pneumatic pump.

Turning to FIG. 1a, this is illustrated in more detail in a functional sense. It is within the skill of those in the art to adapt the functional diagrams in this disclosure to specific fixtures according to the invention. An inlet (110a) supplying liquid from above the system, such as from the roof or upper floors of a tall building or from a mountain top, etc., provides falling liquid into fill valves (100), which have two or more outputs, a first output (101a) to a first reservoir (102a), a second output (101b) to a second reservoir (102b), optionally other outputs to additional reservoirs and an output (101c) to a bypass conduit.

In this state, reservoir A (102a) is filling while in an elevated position, and reservoir B (102b) is emptying (103b) as allowed by the emptying valves (104) into an outlet conduit (110b) which leads downward relative to the inlet conduit (110a). Please note that no liquid is flowing through a turbine in this arrangement.

Figure 1B:
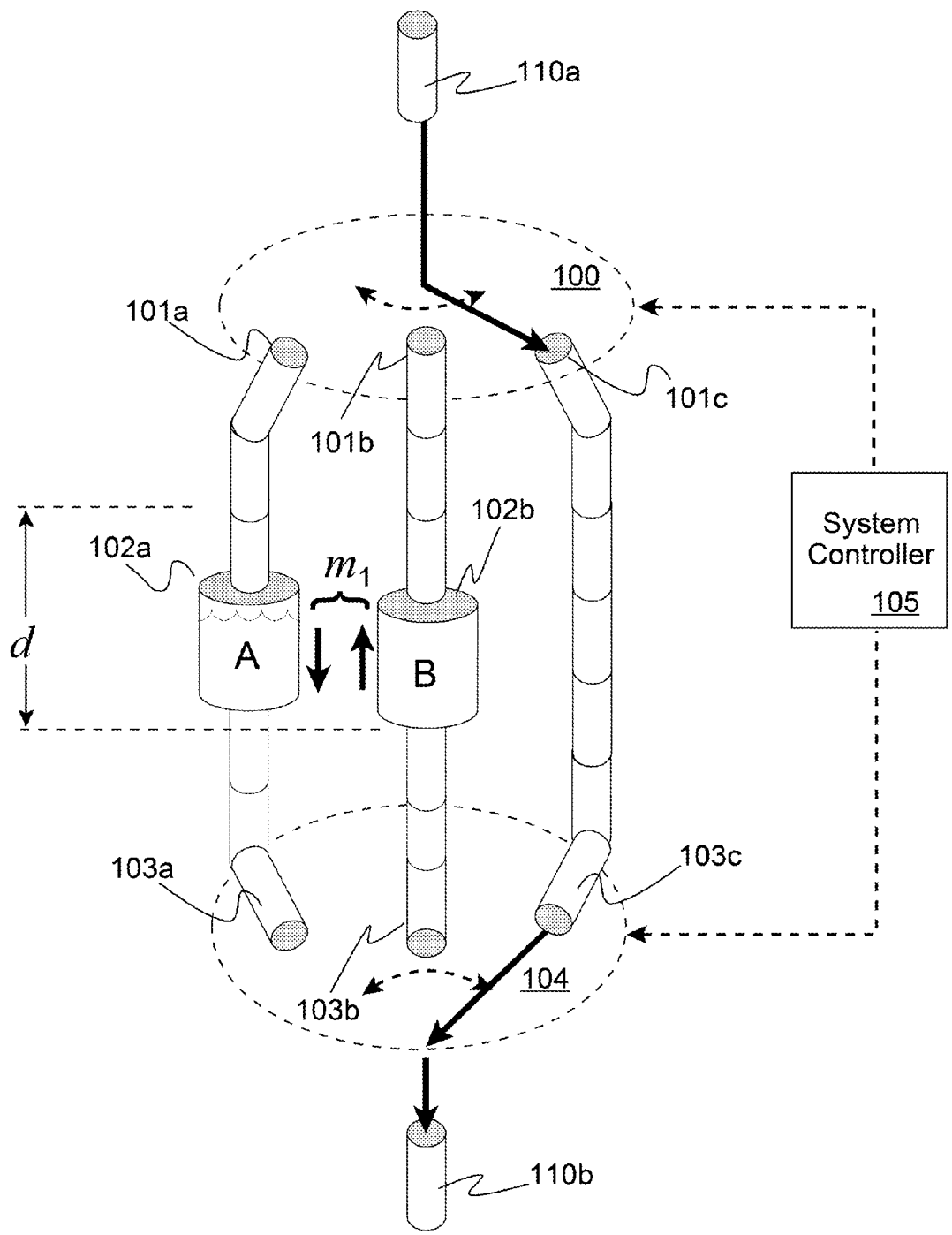

When reservoir A is full and reservoir B is empty, the system enters the state shown in FIG. 1b, in which reservoir A is allowed to fall a distance d and reservoir B is allowed to rise the same distance through mechanical motion $m_1$. System controller (105) during this state closes the valve (101a) to fill reservoir A, and optionally opens the bypass valve (101c), closes the emptying valves (103a, 103b), and opens the bypass empty valve (103c).

Figure 1C:
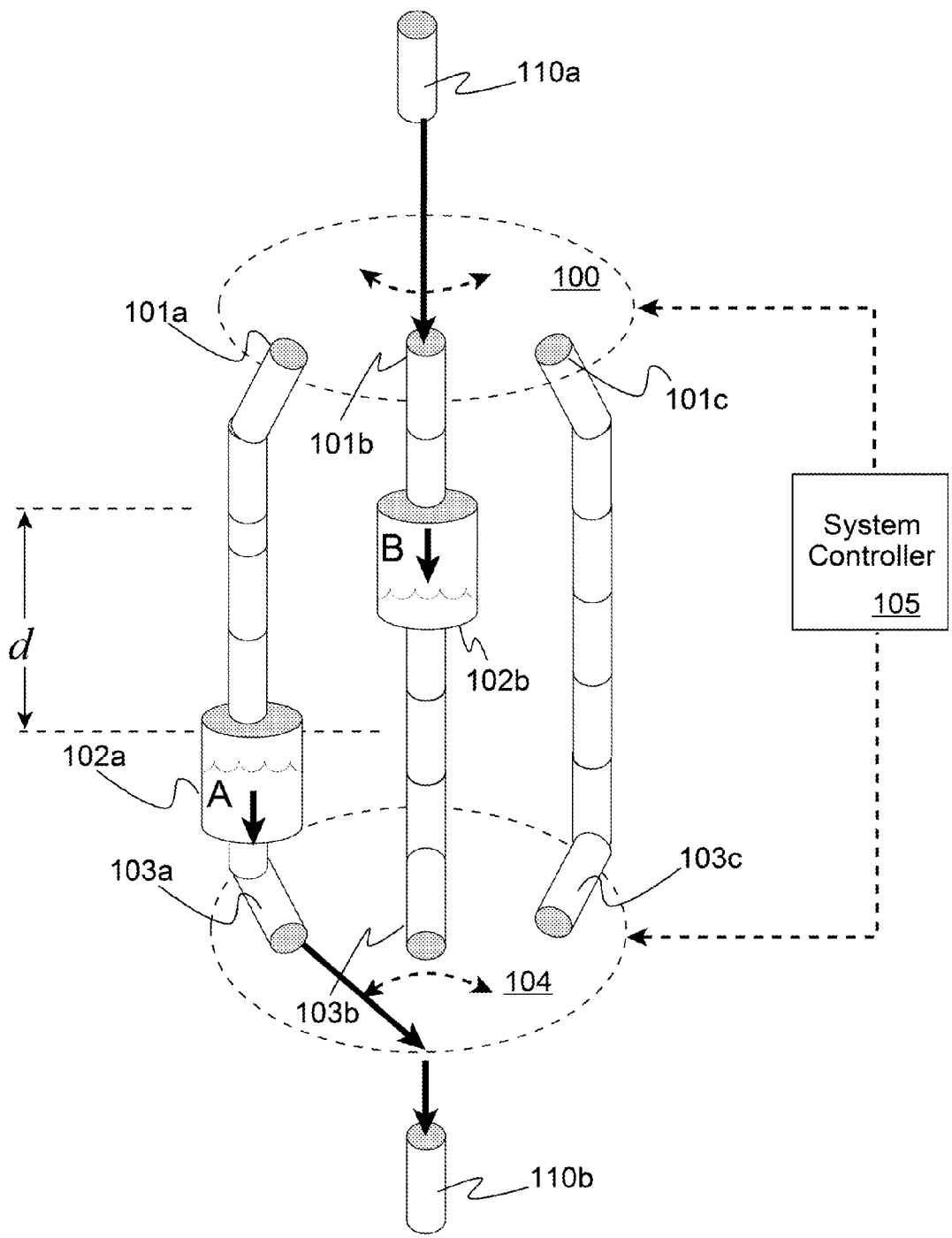

When reservoir B reaches the elevated position, and reservoir A reaches the lower position, the system enters the state show in FIG. 1c. In this state, the system controller opens reservoir A's empty valve (103a), opens the fill valve (101b) to reservoir B, and closed the bypass valves (101c, 103c). The system remains in this state until reservoir B is full, and reservoir A is empty. Please note that no liquid is passing through a turbine in this state.

Figure 1D:
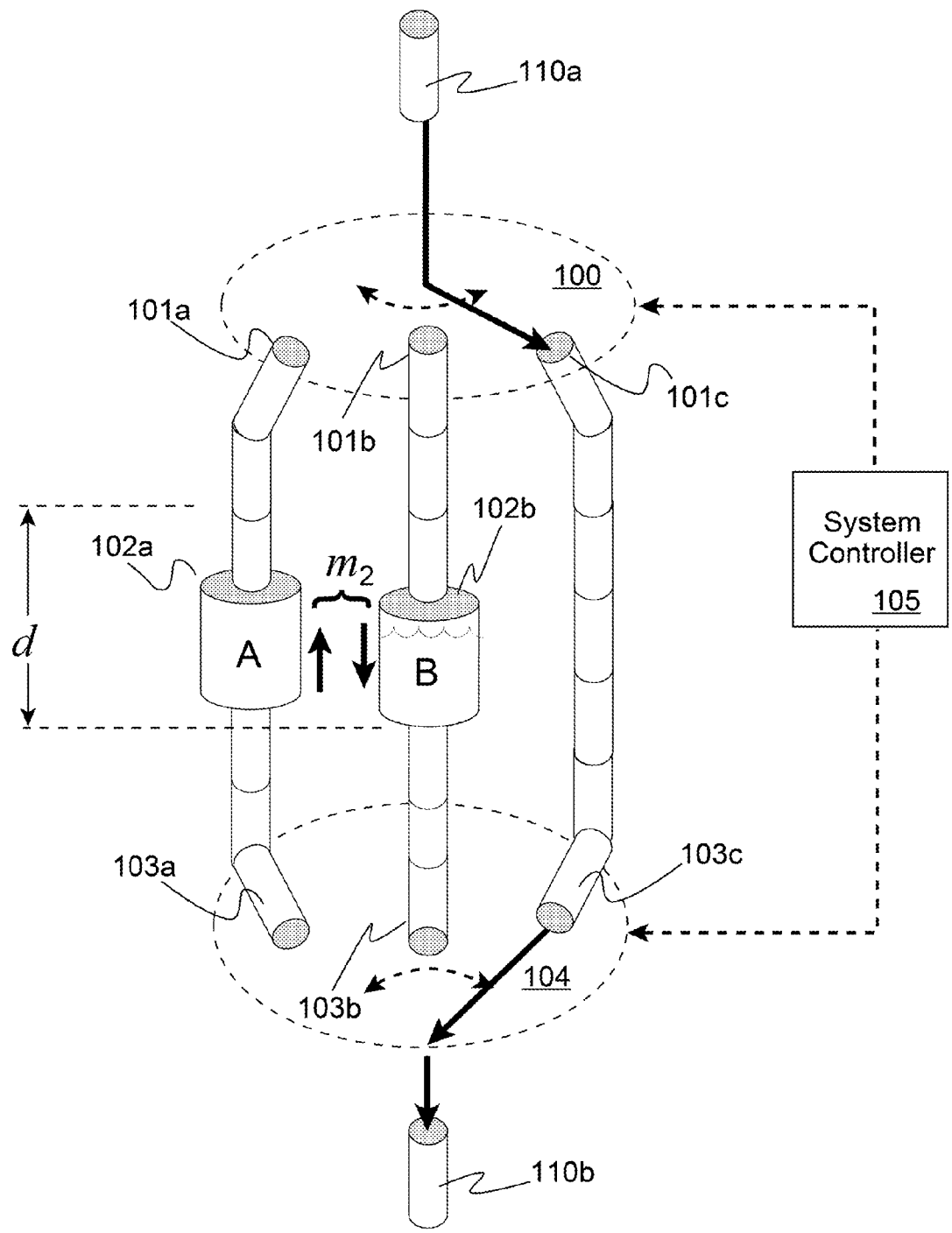

Next, with reservoir B full, the system passes through the state shown in FIG. 1d, in which the system controller closes all valves except the bypass valves (101c, 103c), and during which reservoir A rises and reservoir B lowers through motion $m_2$, with the mechanical movement of the dropping of reservoir B being coupled to a mechanism to charge the kinetic storage device.

The system now returns to the first state, in which reservoir B is emptying and reservoir A and filling. This four-cycle process is repeated indefinitely so long as fill liquid at the inlet (110a) is available. During periods of slow or no fill liquid availability, the kinetic storage device serves to keep the electrical generation continuous.

Referring now to FIG. 2, a functional diagram of the generation chain is shown, in which the two reservoirs are shown metaphorically on a see-saw type of arrangement to illustrate their complementary positioning relationship. Multiple reservoirs may be utilized in other embodiments, with some lowered, some fully raised, and other in various amount of transitioning upwards and downwards in each state of the system.

The fill valves (100) are controlled by the system control (105) to produce mechanical energy impulses to a kinetic storage device (200), which then drives and electrical generator (201) to produce electricity (202). The kinetic storage device may be a fly wheel, a raised weight, or similar storage device.

Figure 3:
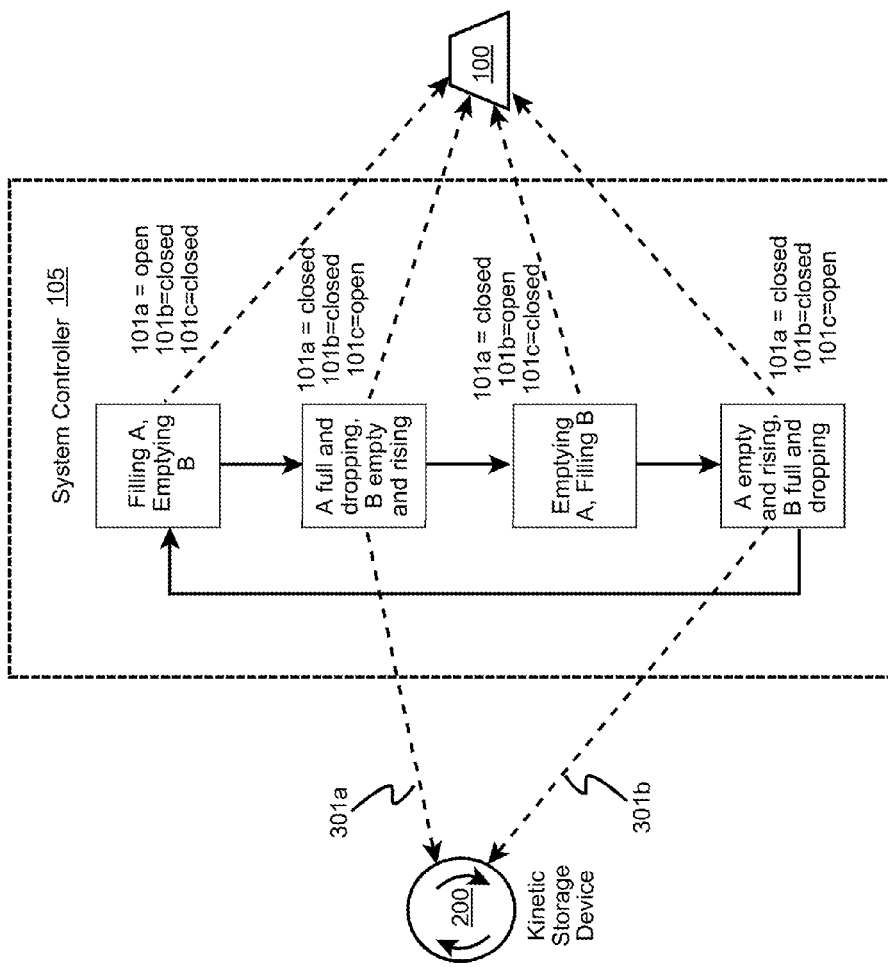
FIG. 3 sets forth the four states of at least one embodiment of the invention, including noting at which state energy is extracted from the falling water (e.g. potential energy is converted to kinetic energy).

FIG. 3 illustrates the four logical states of the system under the control of the system controller (105), and the valve states of the filling valves as described earlier for a two-reservoir embodiment. Especially noteworthing in this view of the system operation is the two impulses of energy (301a, 301b) imparted by the falling motion of reservoir A and reservoir B, respectively. Embodiments according to this method avoid the use of turbines, blades and impellers, and rather use reservoirs to contact the falling liquid and the contaminants it may contain. Thus, filling and emptying of the reservoirs is less likely to lead to clogging or clumping, and less likely to lead to system degradation which requires maintenance.

Although the depictions of the reservoirs in these diagrams are essentially cylindrical, this is for iconic purposes only. In specific realizations of systems according to the invention, the reservoirs may be of any shape which promotes thorough emptying, such as shapes with conical or funnel-shapped bottoms.

Suitable Controllers.

The preceding paragraphs have set forth example logical processes according to the present invention. In such a system, the system controller may be a hydro-mechanical state machine using timers, floats, sensors, and valves, wherein the timers and state transitions may be powered by the fluid pressure itself. In other embodiments, a computer-based controller may be employed, in which the logical processes of the foregoing paragraphs may be realized in computer-executable code, and in which the valves may be electrically controlled and the full/empty sensing may be accomplished through a number of known devices (weight sensors, floats with senders, etc.), In embodiments of the latter type, a suitable computing platform which, when coupled with processing hardware, realize systems according to the present invention, and which, when coupled with tangible, computer readable memory devices, embody computer program products according to the related invention.

Regarding computers for executing the logical processes set forth herein, it will be readily recognized by those skilled in the art that a variety of computers are suitable and will become suitable as memory, processing, and communications capacities of computers and portable devices increases. In such embodiments, the operative invention includes the combination of the programmable computing platform and the programs together. In other embodiments, some or all of the logical processes may be committed to dedicated or specialized electronic circuitry, such as Application Specific Integrated Circuits or programmable logic devices.

Figure 4:
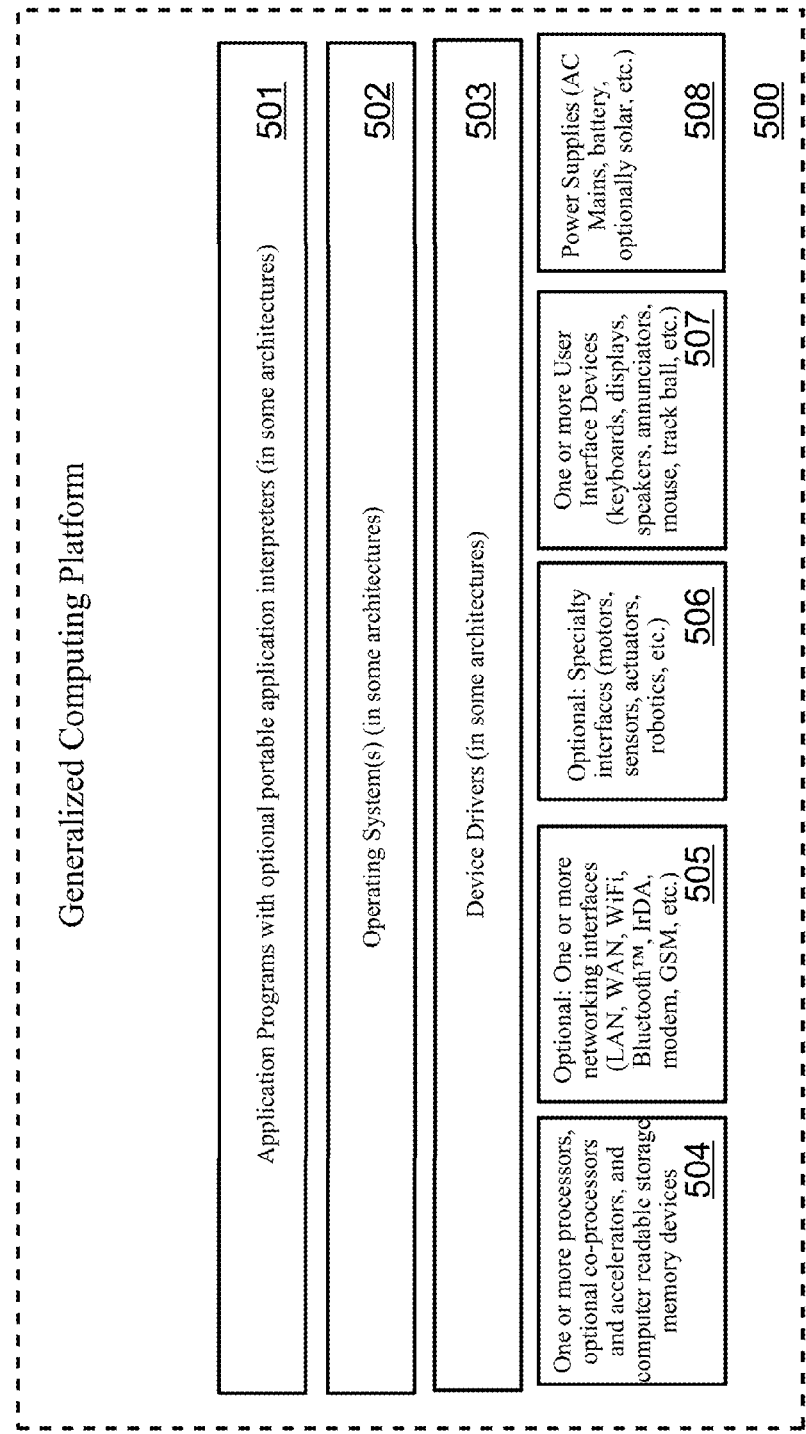
FIG. 4 sets forth a generalized computing platform suitable for realization of at least one embodiment of the present invention.

The present invention may be realized for many different processors used in many different computing platforms. FIG. 4 illustrates a generalized computing platform (500), such as common and well-known computing platforms such as "Personal Computers", web servers such as an IBM iSeries™ server, and portable devices such as personal digital assistants and smart phones, running a popular operating systems (502) such as Microsoft™ Windows™ or IBM™ AIX™, Palm OS™, Microsoft Windows Mobile™, UNIX, LINUX, Google Android™, Apple iPhone iOS™, and others, may be employed to execute one or more application programs to accomplish the computerized methods described herein. Whereas these computing platforms and operating systems are well known an openly described in any number of textbooks, websites, and public "open" specifications and recommendations, diagrams and further details of these computing systems in general (without the customized logical processes of the present invention) are readily available to those ordinarily skilled in the art.

Many such computing platforms, but not all, allow for the addition of or installation of application programs (501) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The "hardware" portion of a computing platform typically includes one or more processors (504) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (505) may be provided, as well as specialty interfaces for specific applications. If the computing platform is intended to interact with human users, it is provided with one or more user interface devices (507), such as display(s), keyboards, pointing devices, speakers, etc. And, each computing platform requires one or more power supplies (battery, AC mains, solar, etc.).

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process(es).

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A method for generating electrical power from falling liquids comprising:
    disposing a first reservoir in a system having a first raised position and a first lowered position in which movement from the raised position to the lowered position imparts mechanical energy to an electrical generator, and a bypass conduit which directs a falling liquid to pass from a height of the raised position down to a height of the lowered position;
    providing a first fill valve to control flow of the falling liquid into the first reservoir and a bypass valve for allowing falling liquid to pass into the bypass conduit, the open and closed states of the first fill valve and the bypass valve being under the control of a controller; and
    controlling states of operation of the reservoir and the valves by:

while the first fill valve is opened and the bypass valve is closed, filling the first reservoir in the first raised position;

responsive to the first reservoir being full, closing the first fill valve, opening the bypass valve, and allowing the first reservoir to fall to the first lowered position while imparting mechanical energy to an electrical generator;

responsive to the first reservoir being emptied in the lowered position, closing the bypass valve and the first fill valve while raising the first reservoir to the first raised position; and repeating the filling, lowering, bypassing and emptying;

wherein electrical generation from the falling of the liquid avoids the liquid contacting or passing through a turbine or impeller and wherein continuous flow of falling liquid is provided during each state of filling, lowering and emptying.

2. The method as set forth in claim 1 further comprising:

disposing a second reservoir in the system having a second raised position and a second lowered position, and in which movement from the second raised position to the second lowered position imparts mechanical energy to the electrical generator;

providing a second fill valve to control flow of the falling liquid into the second reservoir, the open and closed states of the second fill valve being under control of the controller; and and wherein the controlling states of operation of the reservoirs and the valves further comprises:

while the first reservoir is in the first lowered position, opening the second fill valve to fill the second reservoir in the second raised position with falling liquid;

while the first reservoir is rising, closing the second fill valve, allowing the second reservoir to fall to the second lowered position;

while the second reservoir is in the second lowered position and the first reservoir is in the first raised position, emptying the second reservoir.

3. The method as set forth in claim 1 wherein the imparting of mechanical energy comprises imparting mechanical energy to a kinetic storage device prior to being directed to an electrical generator.

4. The method as set forth in claim 3 wherein the imparting of energy to a kinetic storage device comprises imparting mechanical energy to a fly wheel.

\* \* \* \* \*